Figure 6:
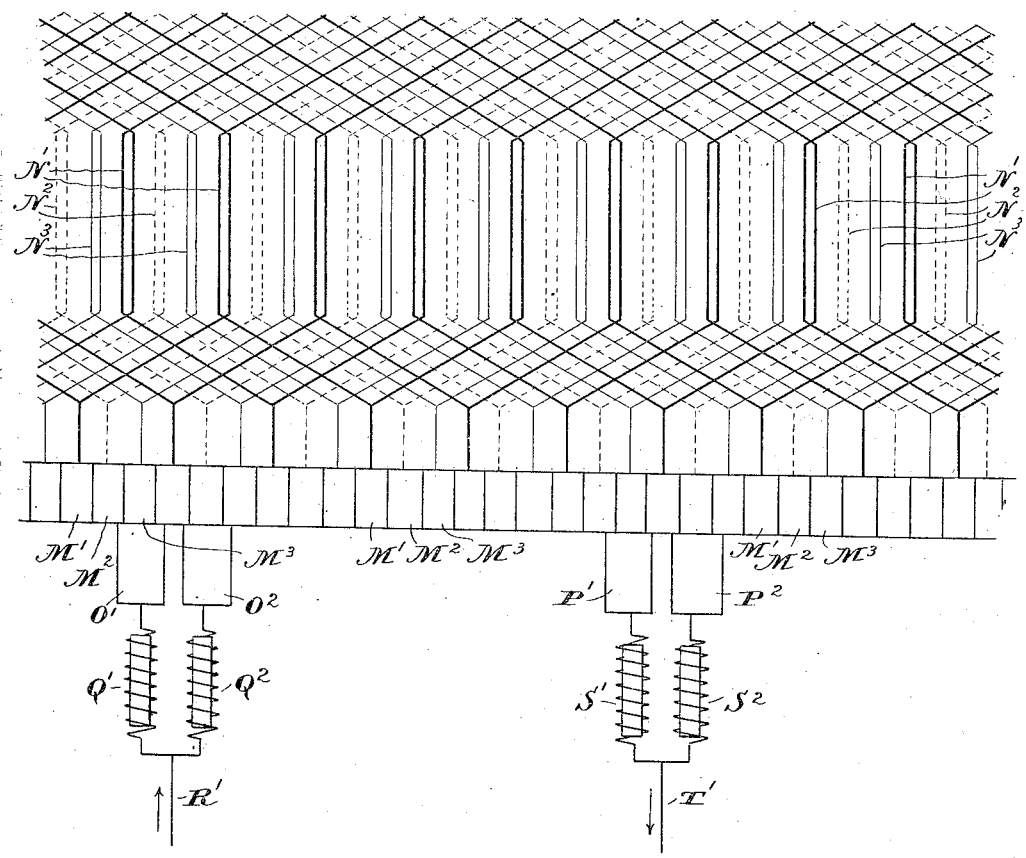

No. 837,889. PATENTED DEC. 4, 1906.
S. S. SEYFERT.
MEANS FOR COMMUTATING MOTOR AND OTHER ELECTRIC CURRENTS.
APPLICATION FILED FEB. 6, 1904.
3 SHEETS—SHEET 1.
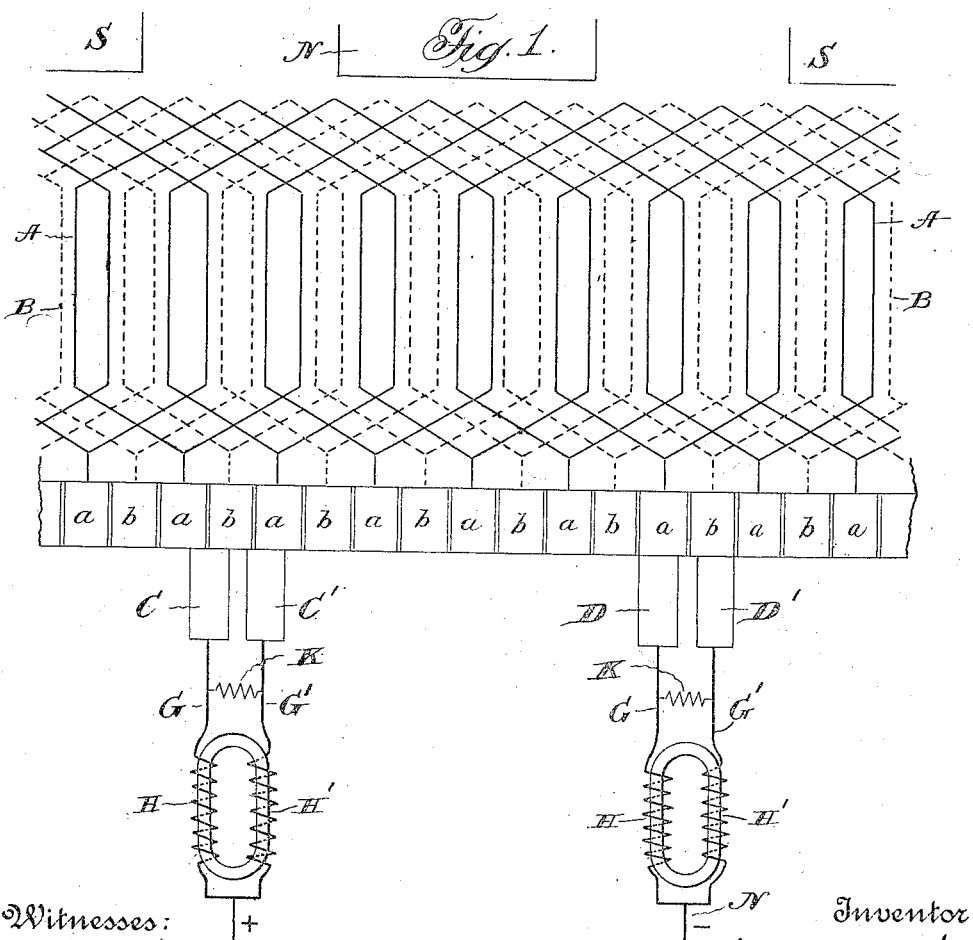

No. 837,889. PATENTED DEC. 4, 1906.
S. S. SEYFERT.
MEANS FOR COMMUTATING MOTOR AND OTHER ELECTRIC CURRENTS.
APPLICATION FILED FEB. 6, 1904.
3 SHEETS—SHEET 2.
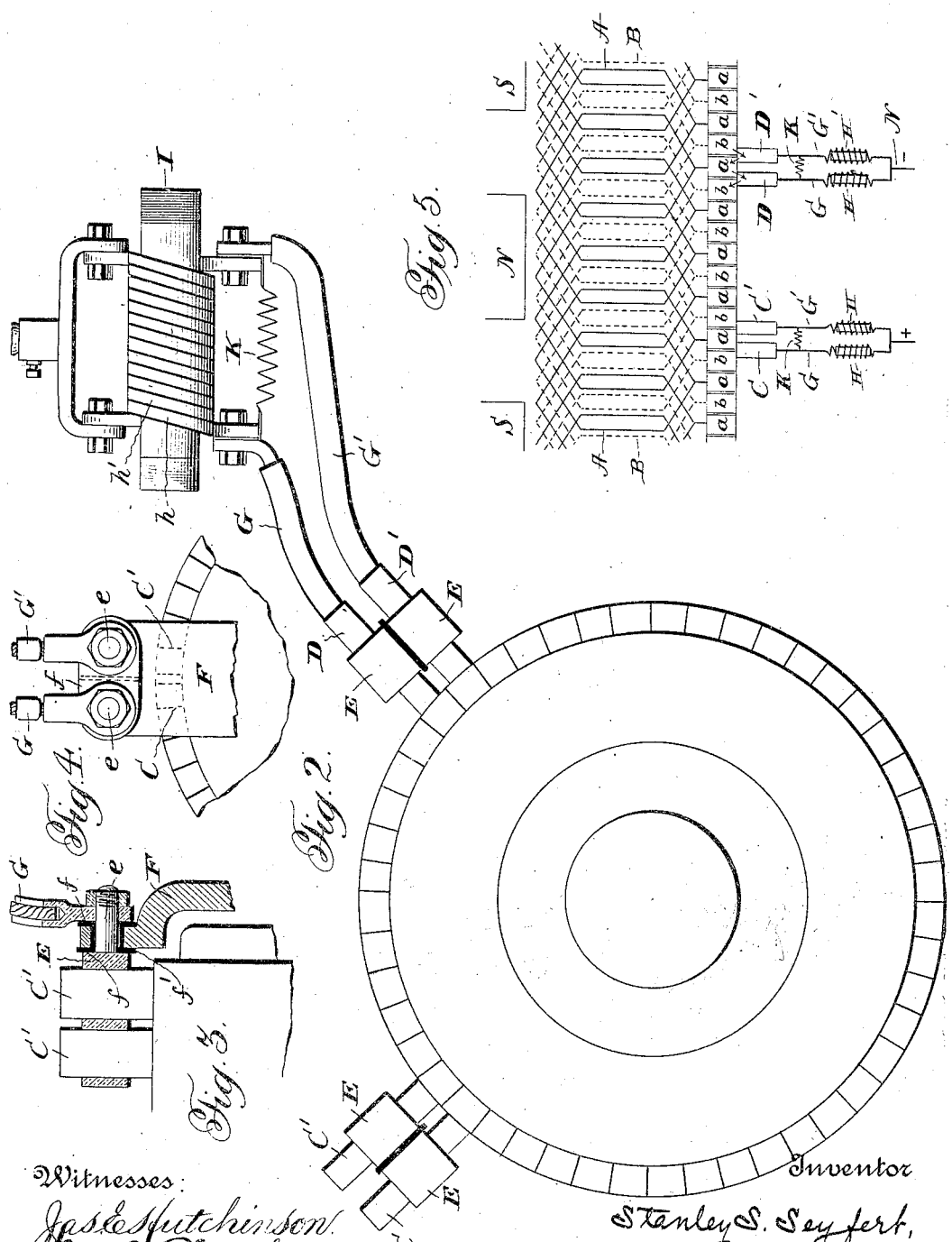
Witnesses:
Jas. E. Hutchinson
J. L. Lawlor
Inventor
Stanley S. Seyfert,
by Edwin J. Prindle, Attorney

UNITED STATES PATENT OFFICE.

STANLEY S. SEYFERT, OF SOUTH BETHLEHEM, PENNSYLVANIA, ASSIGNOR OF ONE-HALF TO WILLIAM H. JACOBS, OF SOUTH BETHLEHEM, PENNSYLVANIA.

MEANS FOR COMMUTATING MOTOR AND OTHER ELECTRIC CURRENTS.

No. 837,889. Specification of Letters Patent. Patented Dec. 4, 1906.

Application filed February 6, 1904. Serial No. 192,421.

*To all whom it may concern:*

Be it known that I, STANLEY S. SEYFERT, of South Bethlehem, in the county of Northampton, and in the State of Pennsylvania, have invented a certain new and useful Improvement in means for Commutating Motor and other Electric Currents; and I do hereby declare that the following is a full, clear, and exact description thereof, reference being had to the accompanying drawings, in which—

Figure 1 is a diagrammatic view of a duplex lap-winding of the armature, developed, of a four-pole motor, such motor embodying my invention. Fig. 2 is an end view of a commutator for use on such an armature, as illustrated in Fig. 1, and having my invention applied thereto. Figs. 3 and 4 are detail views of the brush-holder of my armature; and Fig. 5 is a view of the parts illustrated in Fig. 1, such parts occupying a different relation to each other. Fig. 6 is a diagram showing a triplex winding.

The object of my invention has been to provide means for the commutation of motor or other currents by which sparking can be prevented; and to such ends my invention consists in the means for commutating motor and other electric currents, substantially as hereinafter specified.

For the purpose of explaining my invention I have chosen to illustrate a duplex lap-winding four-pole motor having my invention applied thereto; but it is to be distinctly understood that my invention is applicable to many other forms of motor and to many other devices than motors.

In Fig. 1, which illustrates a development of the armature and commutator, two windings are shown on the armature, the one, A, being shown in full lines and the other, B, being shown in dotted lines, the two windings overlapping each other, but being otherwise independent of each other. Each coil of each winding is connected with a commutator-bar, the bars $a$ and $b$, respectively, of the two windings being placed alternately. Positive brushes C and C' and negative brushes D and D' are illustrated as contacting with the commutator-bars, the said brushes being arranged in pairs circumferentially of the commutator and each brush in such direction being of not greater width than the width of the commutator-bars.

There are also preferably provided several brushes in a row parallel to the axis of the commutator instead of one brush of the length of the commutator-bar. The section illustrated in Fig. 3 shows one row of brushes C'. The brushes of each row are mounted in a holder E, with which they are in electrical contact. The holder E is shown as having a shank $e$, which is extended through an opening in an arm F, the holder E being insulated from the arm by washers $f$ and an insulating-sleeve $f'$. The holder E is secured to the arm by a nut screwed upon its shank $e$, which nut also clamps a lead G. The arm F supports two holders $f^2$, the holders being insulated from the arm and from each other. The leads G are each connected to one end of a choke-coil H or H', such choke-coils being oppositely wound and being connected to the main lead, as illustrated in Fig. 1.

As illustrated in Fig. 2, the choke-coils may consist of two insulated conductors $h$ and $h'$, wound side by side into a helix upon an iron core I. A non-inductive resistance K preferably connects the leads G and G' between the choke-coils and the brushes.

In the operation of a motor constructed as illustrated in Figs. 1 to 5 as each commutator-bar $a$ or $b$ relating to a single winding is separated by a bar connected to the other winding and as the brushes are not wider than the width of a single commutator-bar a single brush can never connect two commutator-bars relating to a common winding, and thus can never short-circuit a subcoil of such winding and can never of itself produce sparking, as can the brush of the ordinary single winding. Two commutator-bars connected to a single coil can, however, be touched by two brushes in the same holder, as illustrated in Fig. 5, where the brushes D and D' touch the two commutator-bars $a$ and $b$. In this case if it were not for the choke-coils the current could flow from one commutator-bar $b$ through the brush D', up the lead G' to the main lead, back the lead G, through the brush D and bar $b$ to the coil, thus making a complete circuit through the subcoil which when broken by the further movements of the armature would cause a spark. This spark I prevent by the interposition of the choke-coils into the leads G and G', for the current through the coils H and H' being in opposite directions and the windings being opposite the flux produced in the core of the choke-coils by the choke-coil H' would be in the same direction as that produced by the coil H, so that a strong choking effect would be produced and the cross-current would be kept down. When, however, current flows from both brushes through both choke-coils to the main lead, or vice versa, the fluxes will be opposite in direction and will neutralize each other and no resistance will be offered to the current other than the ohmic resistance.

When the brushes are in the position illustrated in Fig. 5, it will be seen that the current, as illustrated by the arrows, as seen in the right-hand portion of such figure, can pass from one bar B into the adjacent brush D', thence into the adjacent bar a, and from there through the brush D to the other commutator-bar b, and when the armature had moved sufficiently to carry one commutator-bar b out from under that one of the brushes first passed by the commutator-brush a break in the short circuit would occur with consequently high voltage, which would cause sparking. The brushes C and C' or D and D' of each pair are adjusted slightly away from each other, so that the distance between their respective corners which are last to touch the segments shall be slightly wider apart than the corresponding corners of two segments, the result being that one brush breaks contact with its segment slightly before the other brush breaks contact with its segment. It is to prevent the sparking due to this cause that the non-inductive resistance K is interposed in the leads G and G' between the brushes and the choke-coils, for when the described action occurs the high voltage incident to the breaking of the current of the local circuit finds relief through the non-inductive resistance K. This does not interfere with the lower voltage ordinarily existing between the two parts of the brush set, as such voltage is not sufficient to force any appreciable amount of current through the non-inductive resistance.

The principal reason why single-phase commutating-motors have not heretofore been successfully used with alternating currents of high tension is that such sparking was produced at the commutator as to render such use commercially impractical. Such objection is for all practical purposes eliminated by my invention.

It is obvious that changes can be made in the above-illustrated construction which will not involve a departure from the principle of my invention. For instance, ohmic resistance might be substituted for the choke-coils. The armature may be wound with any other multiplex winding instead of winding, as illustrated, with duplex winding, the only requirement in such case being that the span of the two insulated brushes or sets of brushes shall be sufficient to connect two adjacent bars relating to the same winding. In the case of triplex winding, as illustrated in Fig. 6, of course the commutator-bars will be formed in series of three $M'$ $M^2$ $M^3$, one of each of such series being connected with one of the windings $N'$ $N^2$ $N^3$, respectively. Each brush may then have the width of two segments and similarly with quadruplex or other windings of higher number. In the said figure pairs of brushes $O'$ and $O^2$ and $P'$ and $P^2$ are used as before, the precaution being observed that each brush in the triplex winding be not wider than the two segments and in the case of a quadruplex winding the brush being made not wider than the three segments. Choke-coils $Q'$ and $Q^2$ are, as before, interposed between the armature-lead $R'$ and the brushes $O'$ and $O^2$, respectively, and similar choke-coils $S'$ and $S^2$ are interposed between the armature-lead $T'$ and the brushes $P'$ and $P^2$, respectively.

It is obvious that my invention is applicable to direct-current motors using high-tension currents as well as to alternate-current motors.

Having thus described my invention, what I claim is—

1. In a dynamo-electric machine, the combination of an armature having a commutator, the adjacent bars of such commutator being connected with different armature-windings, and a collecting-brush or brush set which consists of a plurality of parts of the same electric sign, that are adapted to successively contact with the same commutator-bars, said parts being insulated from each other, and having inductance interposed therebetween.

2. In a dynamo-electric machine, the combination of an armature having a multiple winding, and a plurality of insulated brushes of the same electric sign that are adapted to successively contact with the same commutator-bars, said brushes being spaced apart so that they are always in contact with two commutator-bars, branch leads for said brushes, and a resistance interposed between such branch leads.

3. In a dynamo-electric machine, the combination of an armature having a multiplex winding and a plurality of insulated brushes adapted to successively contact with the same commutator-bars, said brushes being spaced apart so that they are always in contact with two commutator-bars, branch leads for such brushes, and a non-inductive resistance interposed between said branch leads.

4. In a dynamo-electric machine, the combination of an armature having a multiplex winding, a plurality of insulated brushes adapted to successively contact with the same commutator-bars, branch leads for such brushes, and choke-coils in opposite inductive relation when energized by current passing through said leads in parallel, one of which is interposed in each of such branch leads.

5. In a dynamo-electric machine, the combination of a plurality of insulated brushes adapted to successively contact with the same commutator-bars, branch leads for such brushes, each of which leads has an inductive resistance therein, said inductive resistances being in opposite inductive relation when energized by current passing through said leads in parallel, and a non-inductive resistance connecting said branch leads between said inductive resistance and said brushes.

6. In a dynamo-electric machine, the combination of an armature having a multiplex winding, brush sets each consisting of a plurality of relatively insulated parts, the several brushes belonging to said parts being of insufficient width to bridge across adjacent segments belonging to the same winding on the armature, one set being placed in advance of the other, said parts of brush sets having leads connected with choke-coils in opposite inductive relation when energized by current passing through said leads in parallel, and the opposite terminals of said coils being connected with a main lead.

7. In a dynamo-electric machine, the combination of an armature having a multiplex winding, brush sets each consisting of a plurality of relatively insulated parts, the several brushes belonging to said parts being of insufficient width to bridge across adjacent segments belonging to the same winding on the armature, one set being placed in advance of the other, said parts of brush sets having leads connected with oppositely-wound choke-coils, the opposite terminals of said coils being connected with a main lead, and said choke-coils having a common core.

8. In a dynamo-electric machine, the combination of an armature having a multiplex winding, brush sets each consisting of a plurality of relatively insulated parts, the several brushes belonging to said parts being of insufficient width to bridge across adjacent segments belonging to the same winding on the armature, one set being placed in advance of the other, said parts of brush sets having leads connected with oppositely-wound choke-coils, the opposite terminals of said coils being connected with a main lead, and said choke-coils having a common core, there being a non-inductive resistance connecting the leads between the choke-coils and the brushes.

9. In a dynamo-electric machine, the combination of an armature having a multiplex winding, brush sets each of which consists of a plurality of relatively insulated parts, said parts being provided with branch leads, there being a choke-coil in each of said leads and said choke-coils being in opposite inductive relation when energized by current passing through said leads in parallel.

10. In a dynamo-electric machine, the combination of an armature having a multiplex winding, brush sets, each of which consists of a plurality of relatively insulated parts, said parts being provided with branch leads, there being a choke-coil in each of said leads and said choke-coils being in opposite inductive relation when energized by current passing through said leads in parallel, and a resistance connecting said leads between said coils and said brushes.

11. In a dynamo-electric machine, the combination of an armature having a multiplex winding, brush sets, each of which consists of a plurality of relatively insulated parts, said parts being provided with branch leads, there being a choke-coil in each of said leads and said choke-coils being in opposite inductive relation when energized by current passing through said leads in parallel, and a non-inductive resistance connecting said leads between said coils and said brushes.

12. In a dynamo-electric machine, the combination of a field excited by an alternating current, an armature having a multiplex winding, brush sets, each of which consists of a plurality of relatively insulated parts, said parts being provided with branch leads, there being a choke-coil in each of said leads and said choke-coils being in opposite inductive relation when energized by current passing through said leads in parallel.

13. In a dynamo-electric machine, the combination of a field excited by an alternating current, an armature having a multiplex winding, brush sets, each of which consists of a plurality of relatively insulated parts, said parts being provided with branch leads, there being a choke-coil in each of said leads and said choke-coils being in opposite inductive relation when energized by current passing through said leads in parallel, and a resistance connecting said leads between said coils and said brushes.

14. In a dynamo-electric machine, the combination of a field excited by an alternating current, an armature having a multiplex winding, brush sets, each of which sets consists of a plurality of relatively insulated parts, said parts being provided with branch leads, there being a choke-coil in each of said leads and said choke-coils being in opposite inductive relation when energized by current passing through said leads in parallel, and a non-inductive resistance connecting said leads between said coils and said brushes.

15. In a dynamo-electric machine, the combination of an armature having a multiplex winding, brushes for each winding, conductors connecting the brushes of like character to a common lead, and means energized by the short-circuited coil of the armature for causing an electromotive force counter to that generated by the short-circuiting of said coil.

16. In a dynamo-electric machine, the combination of an armature having a multiplex winding, brushes for each winding, conductors connecting the brushes of like character to a common lead, and means energized by the short-circuited coil of the armature for causing an electromotive force counter and proportional to that generated by the short-circuiting of said coil.

17. In a dynamo-electric machine, the combination of an armature having a multiplex winding, brushes for each winding, conductors connecting the brushes of like character to a common lead, means energized by the short-circuited coil of the armature for causing an electromotive force counter to that generated by the short-circuiting of said coil, and a non-inductive resistance interposed between said conductors.

18. In a dynamo-electric machine, the combination of an armature having a multiplex winding, brushes for each winding, conductors connecting the brushes of like character to a common lead, means energized by the short-circuited coil of the armature for causing an electromotive force counter and proportional to that generated by the short-circuiting of said coil, and a non-inductive resistance interposed between said conductors.

19. In an alternating-current motor, the combination of an armature, a feed-wire, a device for commutating current from said feed-wire to said armature, said device comprising leads, and a plurality of inductances in each of said leads, inductances of opposite signs in different leads being situated in the same magnetic circuit.

20. In an electrical device, the combination of an armature having coils, a feed-wire, a device for commutating current from said feed-wire to said armature-coils, said device comprising leads, and a plurality of inductive resistances connected in each of said leads, said resistances being active against current tending to form by short-circuiting and being passive against the main armature-current.

21. In an electrical device, the combination of an armature comprising coils, a feed-wire, a device for commutating current from said feed-wire to armature-coils, said device comprising leads, and a plurality of inductance-coils connected in each of said leads, oppositely-wound coils in adjacent leads having a common magnetic circuit.

22. In an electrical device, the combination of an armature comprising coils, a feed-wire, a device for commutating current between said feed-wire and said armature-coils, said device comprising leads, and a plurality of inductance-coils in each of said leads, inductance-coils in adjacent leads being in opposite inductive relation when energized by current passing through them in parallel.

23. In an electrical device, the combination of an armature comprising coils, a feed-wire, a device for commutating current between said feed-wire and said armature-coils, said device comprising leads, and a plurality of inductive resistances connected to each feed-wire, said resistances connected to the same feed-wire being opposed to each other when energized by current passing through them in parallel, and acting in cumulative effect when energized by current passing through them in series.

24. In an electrical device, the combination of an armature comprising coils, a feed-wire, leads between said feed-wire and said coils, commutator-segments in electrical connection with said leads and feed-wire, and a plurality of inductive resistances in each of said leads, there being a plurality of inductances for each feed-wire, said resistances for a given feed-wire being in a common magnetic circuit, and those in adjacent leads being so wound as to be opposed to each other when energized by current passing between said feed-wire and said armature-coils, and to reinforce each other when energized by current passing from one commutator-segment to an adjacent one.

In testimony that I claim the foregoing I have hereunto set my hand.

STANLEY S. SEYFERT.

Witnesses:
Louis G. McCauley,
William H. Jacobs.